(No Model.)

G. B. BETTS.
THIMBLE FOR ROPE CONNECTIONS.

No. 301,951. Patented July 15, 1884.

Witnesses:
Louis M. J. Whitehead
C. Sundgren

Inventor:—
Guernsey B. Betts
by his Attorneys
Brown & Hall

United States Patent Office.

GUERNSEY B. BETTS, OF RONDOUT, NEW YORK.

THIMBLE FOR ROPE-CONNECTIONS.

SPECIFICATION forming part of Letters Patent No. 301,951, dated July 15, 1884.

Application filed April 17, 1884. (No model.)

*To all whom it may concern:*

Be it known that I, GUERNSEY B. BETTS, of Rondout, in the county of Ulster and State of New York, have invented a new and useful Improvement in Thimbles for Rope-Connections, of which the following is a specification.

Whenever a rope or cord is spliced or has a loop formed in it for the attachment of a hook or other device, a thimble having a concave exterior is commonly introduced into the loop, or rather the rope or cord is laid round it and spliced, the thimble serving to protect the rope or cord, and receiving the wear incident to the use of the hook or other device. By use the loop of rope or cord is enlarged, and frequently the thimble drops out, leaving the bare and unprotected rope or cord to chafe and wear.

The object of my invention is to provide a thimble or thimble-like device which cannot be bent by the pull of the eye of the hook upon it, and which may be so secured to the rope or cord forming the loop that it will never drop out, no matter how much the splice may stretch or the loop enlarge.

Figure 1:
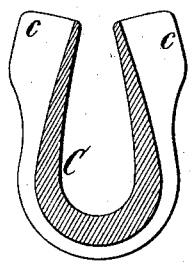
Figure 2:
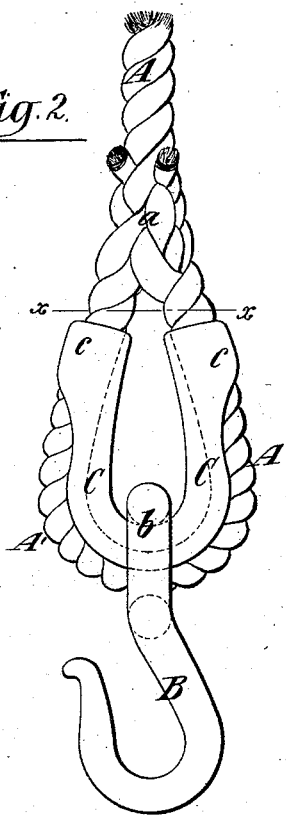
Figure 4:
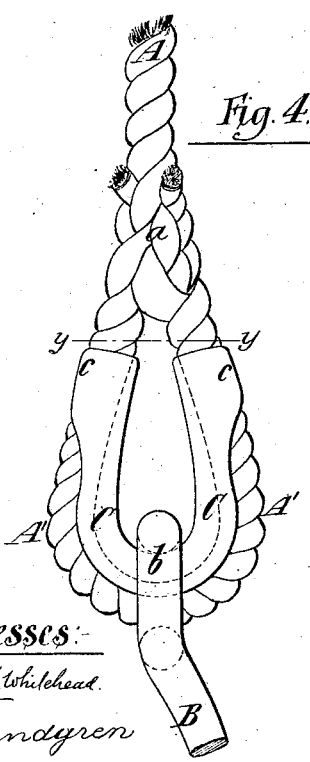
Figure 3:
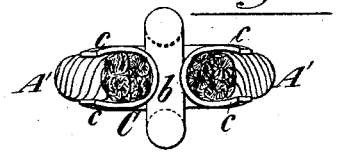
Figure 5:
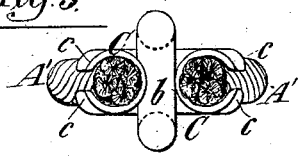

In the accompanying drawings, Figure 1 is a sectional view of a thimble or thimble-like device embodying my invention. Fig. 2 represents the device as applied to a rope or cord, and before it is finally and firmly secured thereto. Fig. 3 is a sectional view on the dotted line $x$ $x$, Fig. 2. Fig. 4 represents the device as finally and securely fastened in the loop of rope or cord, and Fig. 5 is a section on the dotted line $y$ $y$, Fig. 4.

Similar letters of reference designate corresponding parts in all the figures.

A designates a portion of rope or cord, which is formed into a loop, A', by splicing, or splicing and serving, it at $a$; and B is a hook through the eye $b$ of which the rope or cord A is passed.

C designates my improved thimble or thimble-like device, which is of a shape nearly resembling the letter U, the upper ends or extremities being brought as near together as desired. The device C has a concave exterior in a transverse direction, and at the bend or rounded bottom thereof the metal is of considerable thickness, and from that point the thickness is gradually diminished toward the extremities, as most clearly shown in Fig. 1. At the two extremities the device is provided with lips or cheek portions $c$, which receive the rope or cord A between them, as shown in Figs. 2 and 3; and to complete the firm attachment of the device C to the loop the cheek portions or pairs of lips $c$ are closed on the rope or cord, as best shown in Figs. 4 and 5.

The device may be made of wrought-iron or composition to afford facility for closing the pairs of lips $c$ in on the rope or cord, and when the device is thus secured it will not become loosened and drop out of the loop, even though the latter becomes considerably enlarged in use.

A device similar to that shown, but having a uniform thickness throughout instead of an increased thickness at the bend, might be used; but such a device would be liable to close with a sharp bend by reason of a great strain upon the hook, and would therefore be more liable to break.

I am aware that it is not new to provide a thimble-like device having a rounded lower portion and upwardly converging extremities with a cross-brace and guard extending from side to side, so as to form an eye wherein the rope is held, and by which the rope is kept from chafing between the converging portions of the device. I do not claim such a device as of my invention.

What I claim as my invention, and desire to secure by Letters Patent, is—

1. The thimble or thimble-like device herein described, having the bent or rounded lower portion and upwardly-extending portions converging toward their extremities, the device having its greatest thickness of metal at the bend or rounded lower portion, and gradually decreasing in thickness toward the extremities, substantially as and for the purpose herein described.

2. The thimble or thimble-like device herein described, having its exterior concave in transverse section, and having at the extremities pairs of lips which receive the rope or cord between them, and are adapted to be closed thereon, substantially as and for the purpose herein described.

3. The thimble or thimble-like device C, having its exterior concave in transverse section, and provided with pairs of lips $c$ at the extremities, the said device having a gradually-decreased thickness from the bend toward the two extremities, substantially as and for the purpose herein described.

4. The combination, with the rope or cord A, having formed in it the loop A', of the thimble-like device C, having at the extremities pairs of lips c, which are closed on and confine between them the rope or cord, substantially as and for the purpose herein described.

GUERNSEY B. BETTS.

Witnesses:
C. HALL,
MATTHEW POLLOCK.